(12) United States Patent
Morimitsu et al.

(10) Patent No.: US 8,377,595 B2
(45) Date of Patent: Feb. 19, 2013

(54) GELLING AGENT FOR BATTERIES

(75) Inventors: Yuichiro Morimitsu, Hyogo (JP); Masatoyo Yoshinaka, Tokyo (JP); Shinji Kobayashi, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 302 days.

(21) Appl. No.: 12/668,729

(22) PCT Filed: Jul. 9, 2008

(86) PCT No.: PCT/JP2008/062415
§ 371 (c)(1),
(2), (4) Date: Mar. 10, 2010

(87) PCT Pub. No.: WO2009/011264
PCT Pub. Date: Jan. 22, 2009

(65) Prior Publication Data
US 2010/0196763 A1    Aug. 5, 2010

(30) Foreign Application Priority Data

Jul. 19, 2007 (JP) ................................. 2007-188445

(51) Int. Cl.
*H01M 6/14* (2006.01)
(52) U.S. Cl. ......... 429/303; 429/206; 429/300; 524/556
(58) Field of Classification Search .................. 429/206, 429/300, 303; 526/317.1; 524/556
See application file for complete search history.

(56) References Cited

U.S. PATENT DOCUMENTS 6,667,133 B1 * 12/2003 Sumiya et al. ................ 429/303
2004/0170900 A1 * 9/2004 Sumiya et al. ................ 429/303

FOREIGN PATENT DOCUMENTS

| AU | 608473 | 3/1991 |
|---|---|---|
| EP | 0 414 990 | 3/1991 |
| EP | 1 162 676 | 12/2001 |
| EP | 1 427 040 | 6/2004 |
| JP | 3-89458 | 4/1991 |
| JP | 2000-306589 | 11/2000 |
| JP | 2003-123763 | 4/2003 |

* cited by examiner

*Primary Examiner* — Vu A Nguyen
(74) *Attorney, Agent, or Firm* — Hamre, Schumann, Mueller & Larson, P.C.

(57) ABSTRACT

The present invention has its objective to provide a gelling agent for a battery, which forms a paste gel in a short period of time on dissolution in an alkaline electrolyte. The gel has less bubbles and a high gel density. The gelling agent for a battery comprises granular carboxyl group-containing polymer particles having a median particle diameter of 100 to 800 μm and a bulk density of 0.30 g/ml or more, and has a gel turbidity of 200 ppm or less and a gel density of 1.37 g/ml or more in a gel. The gel is prepared by adding 2 parts by mass of the granular carboxyl group-containing polymer particles to 98 parts by mass of 40% by mass of an aqueous potassium hydroxide solution.

3 Claims, No Drawings

GELLING AGENT FOR BATTERIES

TECHNICAL FIELD

The present invention relates to a gelling agent for a battery. In more detail, the present invention relates to a gelling agent for a positive electrode and/or a negative electrode of an alkaline battery.

BACKGROUND ART

Carboxymethyl cellulose, polyacrylic acid or its salt, and natural gum, for example, have been conventionally known as a gelling agent for alkaline batteries. The gelling agent for alkaline batteries needs to be stable over a long period of time also under strong alkaline conditions of an alkaline electrolyte. In recent years, carboxyl group-containing polymers that have, as a main monomer component, $\alpha,\beta$-unsaturated carboxylic acid-type compound—in particular, (meth)acrylic acid and its salt—have been mainly used.

Various performances are required for the gelling agent for alkaline batteries. One of the required performances is shock resistance for protecting the inside of the batteries upon application of external force thereto. As a method for improving shock resistance, there is proposed a method with a swellable carboxyl group-containing polymer that swells upon absorption of an alkaline electrolyte (see Patent Document 1).

On the other hand, there have been demanded performances with which appropriate viscosity, electrolyte retainability, and stability are imparted to an alkaline electrolyte, and which improves dispersibility of various metals to be added to an alkaline electrolyte. Proposed as a method for improving dispersibility is a method with a carboxyl group-containing polymer that dissolves in an alkaline electrolyte and serves as a paste gel (see Patent Document 2).

Since the carboxyl group-containing polymer is usually a fine powder, undissolved lumps tend to occur when the polymer is added to an alkaline electrolyte (alkaline solution). A method for adding a carboxyl group-containing polymer with high-speed stirring of an alkaline electrolyte to prevent formation of undissolved lumps is proposed. However, since the alkaline electrolyte embraces air under stirring and upon dissolution, a gel including a large amount of air (including bubbles) in the alkaline electrolyte is formed. When a gel includes bubbles, it takes time and effort to remove the bubbles from the gel, and thus it is difficult to remove all the bubbles. Also, problematically, the gel including bubbles increases its volume by the bubbles, and the filling rate to batteries per unit volume decreases, leading to deterioration in battery performances.

Patent Document 1: Japanese Kokai Publication Hei-3-89458 (JP-A H03-89458)

Patent Document 2: Japanese Kokai Publication 2003-123763 (JP-A 2003-123763)

DISCLOSURE OF THE INVENTION

Problems to be Solved by the Invention

The present invention has its object to provide a gelling agent for a battery, which forms a paste gel in a short period of time on dissolution in an alkaline electrolyte. The gel has less bubbles and a high gel density.

Means for Solving the Problems

The present invention relates to a gelling agent for a battery, which comprises granular carboxyl group-containing polymer particles having a median particle diameter of 100 to 800 μm and a bulk density of 0.30 g/ml or more, and has a gel turbidity of 200 ppm or less and a gel density of 1.37 g/ml or more in a gel, the gel being prepared by adding 2 parts by mass of the granular carboxyl group-containing polymer particles to 98 parts by mass of 40% by mass of an aqueous potassium hydroxide solution.

Effects of the Invention

The present invention makes it possible to provide a gelling agent for a battery, which forms a paste gel in a short period of time on dissolution in an alkaline electrolyte. The gel has less bubbles and a high gel density. Also, the improvement of the gel density enhances a gel filling rate of a battery, and better battery performances are expected.

BEST MODE FOR CARRYING OUT THE INVENTION

The gelling agent for a battery according to the present invention comprises granular carboxyl group-containing polymer particles having a median particle diameter of 100 to 800 μm and a bulk density of 0.30 g/ml or more, and has a gel turbidity of 200 ppm or less and a gel density of 1.37 g/ml or more in a gel, the gel being prepared by adding 2 parts by mass of the granular carboxyl group-containing polymer particles to 98 parts by mass of 40% by mass of an aqueous potassium hydroxide solution.

The median particle diameter of the granular carboxyl group-containing polymer particles used in the present invention is 100 to 800 μm, desirably 100 to 700 μm, and more desirably 150 to 700 μm. When the median particle diameter is 100 μm or more, upon dissolution of the granular carboxyl group-containing polymer particles in an alkaline electrolyte, only a small amount of undissolved lumps occurs and the particles dissolve in a short period of time. When the median particle diameter is 800 μm or less, the proportion of coarser particles tends to decrease, and the particles dissolve in a short period of time upon dissolution in an alkaline electrolyte. It is to be noted that the "median particle diameter" used herein refers to the value measured with the below-mentioned measuring method.

The bulk density of the granular carboxyl group-containing polymer particles used in the present invention is 0.30 g/ml or more, desirably 0.30 to 0.60 g/ml, and more desirably 0.35 to 0.55 g/ml. The bulk density of 0.30 g/ml or more enables reduction in transportation costs and storage sites. It is to be noted that the "bulk density" used herein refers to the value measured with the below-mentioned measuring method.

When a gel is prepared by adding 2 parts by mass of the granular carboxyl group-containing polymer particles used in the present invention to 98 parts by mass of 40% by mass of an aqueous potassium hydroxide solution, the gel turbidity is 200 ppm or less, desirably 150 ppm or less, and more desirably 100 ppm or less. When the gel turbidity is 200 ppm or less, light penetrates through the gel, and it can be regarded that the gel includes only a small amount of bubbles. The gel including a small amount of bubbles has a high gel density, and thus a gel filling rate of a battery is improved, and better battery performances are expected. On the other hand, the gel having a turbidity of more than 200 ppm includes a large amount of bubbles, and the battery performances may not be improved. It is to be noted that the "gel turbidity" used herein refers to the value measured with the below-mentioned measuring method. Also, the granular carboxyl group-containing polymer particles used in the present invention form a paste gel on preparation of the gel by the below-mentioned method.

When a gel is prepared by adding 2 parts by mass of the granular carboxyl group-containing polymer particles used in the present invention to 98 parts by mass of 40% by mass of an aqueous potassium hydroxide solution, the gel density is 1.37 g/ml or more, desirably 1.37 to 1.41 g/ml, and more desirably 1.38 to 1.41 g/ml. When the gel density is 1.37 g/ml or more, it can be regarded that the gel includes only a small amount of bubbles. Also, the sufficient gel density enhances a gel filling rate of a battery, and better battery performances are expected. It is to be noted that the "gel density" used herein refers to the value measured with the below-mentioned measuring method.

When a gel is prepared by adding 2 parts by mass of the granular carboxyl group-containing polymer particles used in the present invention to 98 parts by mass of 40% by mass of an aqueous potassium hydroxide solution, the gelation time is desirably 60 minutes or less, and more desirably 50 minutes or less. When the gelation time is 60 minutes or less, it can be regarded as a fast gelation, and production efficiency of batteries is high, which causes an economic advantage. It is to be noted that the "gelation time" used herein refers to the value measured with the below-mentioned measuring method.

The granular carboxyl group-containing polymer particle used in the present invention is not particularly restricted as long as it has a median particle diameter of 100 to 800 μm and a bulk density of 0.30 g/ml or more. The granular carboxyl group-containing polymer particle is desirably produced, for example, by allowing a carboxyl group-containing polymer particle having an $\alpha,\beta$-unsaturated carboxylic acid-type compound as a main monomer component to absorb water and/or a polar organic solvent to give an aggregate, followed by drying the aggregate and then grinding the dried aggregate.

The carboxyl group-containing polymer particle having an $\alpha,\beta$-unsaturated carboxylic acid-type compound as a main monomer component is desirably produced, for example, by polymerizing the $\alpha,\beta$-unsaturated carboxylic acid-type compound in an inert solvent that dissolves the $\alpha,\beta$-unsaturated carboxylic acid-type compound but does not dissolve a carboxyl group-containing polymer. Specific examples thereof include: crosslinked carboxyl group-containing polymer particles produced by polymerizing the $\alpha,\beta$-unsaturated carboxylic acid-type compound and a compound containing two or more ethylenically unsaturated groups in an inert solvent in the presence of a radical polymerization initiator; and alkyl-modified carboxyl group-containing polymer particles produced by polymerizing the $\alpha,\beta$-unsaturated carboxylic acid-type compound and a (meth)acrylic acid alkyl ester containing an alkyl group of 10 to 30 carbon atoms, in an inert solvent in the presence of a radical polymerization initiator.

The $\alpha,\beta$-unsaturated carboxylic acid-type compound to be used in producing the crosslinked carboxyl group-containing polymer particles mentioned above are not particularly restricted but include, among others, an $\alpha,\beta$-unsaturated carboxylic acid such as acrylic acid, methacrylic acid, crotonic acid, maleic acid, itaconic acid, and fumaric acid; an $\alpha,\beta$-unsaturated carboxylic acid alkyl ester such as methyl acrylate, ethyl acrylate, octyl acrylate, lauryl acrylate, myristyl acrylate, behenyl acrylate, lauryl methacrylate, myristyl methacrylate, and behenyl methacrylate, and the like. These may be used singly or two or more of them may be used in combination.

In the present invention, acrylic and methacrylic may be collectively referred to as (meth)acrylic.

In producing the above-mentioned crosslinked carboxyl group-containing polymer particles, the $\alpha,\beta$-unsaturated carboxylic acid-type compound is used desirably in an amount of 6 to 25 parts by volume, more desirably 8 to 22 parts by volume, further desirably 13 to 20 parts by volume, relative to 100 parts by volume of the inert solvent to be specifically described later herein. When the amount used of the $\alpha,\beta$-unsaturated carboxylic acid-type compound is smaller than 6 parts by volume, the amount of the crosslinked carboxyl group-containing polymer particles to be obtained is small, which causes an economic disadvantage. When the amount used of the $\alpha,\beta$-unsaturated carboxylic acid-type compound is in excess of 25 parts by volume, the crosslinked carboxyl group-containing polymer particles will precipitate out with the progress of the reaction, possibly making it difficult to perform uniform stirring and to control the reaction.

The above-mentioned compound containing two or more ethylenically unsaturated groups is not particularly restricted but includes, among others, two or more acrylate group-containing polyols, derived from ethylene glycol, propylene glycol, polyoxyethylene glycol, polyoxypropylene glycol, glycerol, polyglycerol, trimethylolpropane, pentaerythritol, saccharose, sorbitol and the like; two or more allyl ether group-containing polyols, derived from such polyols as mentioned above; diallyl phthalate, triallyl phosphate, allyl methacrylate, tetrallyloxyethane, triallyl cyanurate, divinyl adipate, vinyl crotonate, 1,5-hexadiene and divinylbenzene. Among them, pentaerythritol allyl ether and polyallyl saccharose are favorably used because they, even when used in a small proportion, can give a gel for batteries having a high thickening property.

The compound containing two or more ethylenically unsaturated groups is used desirably in an amount of 0.01 to 2 parts by mass, and more desirably 0.3 to 1.5 parts by mass, relative to 100 parts by mass of the $\alpha,\beta$-unsaturated carboxylic acid-type compound. When the amount used of the compound containing two or more ethylenically unsaturated groups is smaller than 0.01 parts by mass, the gel for batteries prepared from the granular carboxyl group-containing polymer particles obtained may show reduced viscosity, and a paste gel is less likely to be obtained. When the amount used of the compound containing two or more ethylenically unsaturated groups is above 2 parts by mass, an insoluble gel is more likely to be formed on preparation of the gel for batteries from the granular carboxyl group-containing polymer particles obtained.

The $\alpha,\beta$-unsaturated carboxylic acid-type compound to be used in producing the above-mentioned alkyl-modified carboxyl group-containing polymer particles are not particularly restricted but include, among others, acrylic acid, methacrylic acid, crotonic acid, maleic acid, itaconic acid and fumaric acid. These may be used singly or two or more of them may be used in combination.

In producing the above-mentioned alkyl-modified carboxyl group-containing polymer particles, the $\alpha,\beta$-unsaturated carboxylic acid-type compound is used desirably in an amount of 6 to 25 parts by volume, more desirably 8 to 22 parts by volume, and particularly desirably 13 to 20 parts by volume, relative to 100 parts by volume of the inert solvent to be specifically described later herein. When the amount used of the $\alpha,\beta$-unsaturated carboxylic acid-type compound is smaller than 6 parts by volume, the amount of the alkyl-modified carboxyl group-containing polymer particles to be obtained is small, which causes an economic disadvantage. When the amount used of the $\alpha,\beta$-unsaturated carboxylic acid-type compound is in excess of 25 parts by volume, the alkyl-modified carboxyl group-containing polymer particles will precipitate out with the progress of the reaction, possibly making it difficult to perform uniform stirring and to control the reaction The (meth)acrylic acid alkyl ester containing an alkyl group of 10 to 30 carbon atoms is an ester derived from (meth)acrylic acid and a higher alcohol containing an alkyl group of 10 to 30 carbon atoms and, as examples thereof, there may be mentioned an ester derived from (meth)acrylic acid and stearyl alcohol, an ester derived from (meth)acrylic acid and eicosanol, an ester derived from (meth)acrylic acid and behenyl alcohol and an ester derived from (meth)acrylic acid and tetracosanol, among others. Among them, stearyl methacrylate, eicosanyl methacrylate, behenyl methacrylate and tetracosanyl methacrylate are desirably used because the gel for batteries prepared from the granular carboxyl group-containing copolymer particles obtained is superior in viscosity characteristics. As the (meth)acrylic acid alkyl ester containing an alkyl group of 10 to 30 carbon atoms, a commercial product such as Blemmer VMA 70 produced by NOF Corporation may also be used.

The (meth)acrylic acid alkyl ester containing an alkyl group of 10 to 30 carbon atoms is used desirably in an amount of 0.5 to 20 parts by mass, and more desirably 1 to 10 parts by mass, relative to 100 parts by mass of the α,β-unsaturated carboxylic acid-type compound. When the (meth)acrylic acid alkyl ester containing an alkyl group of 10 to 30 carbon atoms is used in an amount smaller than 0.5 parts by mass relative to 100 parts by mass of the α,β-unsaturated carboxylic acid-type compound, the gel for batteries prepared from the granular carboxyl group-containing copolymer particles obtained may be high in turbidity. When it is used in excess of 20 parts by mass, the granular carboxyl group-containing copolymer particles obtained may be poor in solubility in an alkaline electrolyte.

The above-mentioned radical polymerization initiator is not particularly restricted but includes, among others, α,α'-azobisisobutyronitrile, 2,2'-azobis-2,4-dimethylvaleronitrile, dimethyl-2,2'-azobisisobutyrate, benzoyl peroxide, lauroyl peroxide, cumene hydroperoxide, and tert-butyl hydroperoxide.

The radical polymerization initiator is used desirably in an amount of 0.01 to 0.45 parts by mass, and more desirably 0.01 to 0.35 parts by mass, relative to 100 parts by mass of the α,β-unsaturated carboxylic acid-type compound. When the radical polymerization initiator is used in an amount smaller than 0.01 parts by mass, the rate of reaction may become slow to cause an economic disadvantage. When the radical polymerization initiator is used in an amount exceeding 0.45 parts by mass, the reaction speed is high, and therefore it is difficult to control the reaction.

The inert solvent refers to a solvent that dissolves the α,β-unsaturated carboxylic acid-type compound, and the compound containing two or more ethylenically unsaturated groups or the (meth)acrylic acid alkyl ester containing an alkyl group of 10 to 30 carbon atoms, but does not dissolve the carboxyl group-containing polymer to be obtained.

As such inert solvent, there may be mentioned, for example, normalpentane, normalhexane, normalheptane, normaloctane, isooctane, cyclopentane, methylcyclopentane, cyclohexane, methylcyclohexane, benzene, toluene, xylene, chlorobenzene, ethylene dichloride, ethyl acetate, isopropyl acetate, ethyl methyl ketone and isobutyl methyl ketone. These may be used singly or two or more of them may be used in combination. Among them, ethylene dichloride and normalhexane are favorably used from the viewpoints of the quality stability and ready availability.

The atmosphere in which the α,β-unsaturated carboxylic acid-type compound and the compound containing two or more ethylenically unsaturated groups are polymerized or the α,β-unsaturated carboxylic acid-type compound and the (meth)acrylic acid alkyl ester containing an alkyl group of 10 to 30 carbon atoms are polymerized is desirably an inert gas atmosphere such as a nitrogen gas and argon gas atmosphere.

The reaction temperature is desirably 50 to 90° C., and more desirably 55 to 75° C., from the viewpoint that the reaction solution is to be inhibited from increasing in viscosity and that the reaction is more easily controlled.

The reaction time cannot be absolutely specified since it depends on the reaction temperature, but it is generally 2 to 10 hours.

After completion of the reaction, the reaction solution is heated to 80 to 130° C. to thereby distill off the inert solvent, whereupon the carboxyl group-containing polymer particles can be obtained in the form of a fine white powder. When the heating temperature is lower than 80° C., a long period of time may be required for drying. When it is higher than 130° C., an insoluble gel is more likely to be formed on preparation of the gel for batteries from the granular carboxyl group-containing polymer particles to be obtained.

An aggregate of the carboxyl group-containing polymer particles is prepared by allowing the carboxyl group-containing polymer particles obtained in the above-mentioned process to absorb water and/or a polar organic solvent to a liquid content of 5 to 25% by mass. Thereafter, the aggregate is dried and then the dried aggregate is ground to give granular carboxyl group-containing polymer particles.

Examples of the water include clean water, industrial water, ion-exchange water, and distilled water.

Desirable examples of the polar organic solvent include alcohols containing 1 to 5 carbon atoms, ketones containing 3 to 6 carbon atoms, esters containing 3 to 6 carbon atoms, and ethers containing 4 to 6 carbon atoms.

Examples of the alcohols containing 1 to 5 carbon atoms include methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 1,1-dimethyl-1-propanol, 1,2-dimethyl-1-propanol, and 2,2-dimethyl-1-propanol.

Examples of the ketones containing 3 to 6 carbon atoms include acetone, ethyl methyl ketone, methyl propyl ketone, diethyl ketone, butyl methyl ketone, and isobutyl methyl ketone.

Examples of the esters containing 3 to 6 carbon atoms include methyl acetate, ethyl acetate, propyl acetate, isopropyl acetate, butyl acetate, isobutyl acetate, methyl propionate, ethyl propionate, propyl propionate, methyl butanoate, and ethyl butanoate.

Examples of the ethers containing 4 to 6 carbon atoms include methyl propyl ether, butyl methyl ether, diethyl ether, ethyl propyl ether, butyl ethyl ether, and dipropyl ether.

These may be used singly, or two or more kinds thereof may be used in combination. Methanol, ethanol, acetone, ethyl methyl ketone, and ethyl acetate are suitably used among these from the viewpoint of ready availability.

The liquid content on the occasion of forming the aggregate by allowing the carboxyl group-containing polymer particles to absorb water and/or a polar organic solvent is 5 to 25% by mass, and desirably 5 to 23% by mass. When the liquid content is lower than 5% by mass, the effect of aggregating the carboxyl group-containing polymer particles is insignificant and sufficient level of aggregation may not be obtained. Conversely, when the liquid content of the carboxyl group-containing polymer particles is higher than 25% by mass, the aggregation is excessively promoted and therefore grinding after drying becomes difficult and, in addition, the drawbacks that, for example, the time required for dissolution when dispersing the obtained particles in an alkaline electrolyte becomes prolonged are presented.

The "liquid content" used herein refers to the percentage of the increased mass of the carboxyl group-containing polymer particles resulting from the absorption of water and/or a polar organic solvent to the mass of the particles before absorbing liquid. More specifically, the carboxyl group-containing polymer particles were allowed to absorb the water and/or the polar organic solvent, and the percentage is calculated from the mass before the absorption and that after the absorption, as follows.

$$\text{Liquid content (\% by mass)} = (Y-X)/X \times 100$$

(In the above formula, X is the mass (g) of the carboxyl group-containing polymer particles before absorbing the water and/or the polar organic solvent, and Y is the mass (g) of the carboxyl group-containing polymer particles after absorbing the water and/or the polar organic solvent.)

The method for allowing the carboxyl group-containing polymer particles to absorb water to a liquid content of 5 to 25% by mass is not particularly restricted but includes, for example, the method comprising spraying the carboxyl group-containing polymer particles with fine drops of water, and the method comprising maintaining the carboxyl group-containing polymer particles in a specific atmosphere. In particular, the method comprising maintaining the carboxyl group-containing polymer particles in an atmosphere at a temperature of 25 to 100° C., desirably 30 to 90° C., and a relative humidity of not lower than 30% but lower than 100%, and desirably not lower than 40% but lower than 100% is desirably used. When the maintaining temperature is lower than 25° C., the time required for allowing the carboxyl group-containing polymer particles to aggregate may be prolonged. When the maintaining temperature exceeds 100° C., it is not desirable because energy is required in large quantities. When the relative humidity is lower than 30%, the time required for allowing the carboxyl group-containing polymer particles to aggregate may be prolonged. When the relative humidity is 100%, it is not desirable because water is formed as a result of dew condensation and the carboxyl group-containing polymer particles swell in that water, with the result that the finally-obtained granule is not porous and therefore poor in solubility in an alkaline electrolyte.

The maintaining time cannot be absolutely specified because the state of aggregation varies depending on the liquid content attained at the temperature and relative humidity employed, and it is not particularly restricted provided that the carboxyl group-containing polymer particles can be maintained for a period necessary for sufficient aggregation thereof. For example, under such conditions as 30° C. and relative humidity of 75%, it is desirable to maintain the carboxyl group-containing polymer particles for a long period such as about 2 to 4 hours to attain a high liquid content such as about 15 to 20% by mass. On the other hand, under such conditions as 80° C. and relative humidity of 80%, a short period of maintaining such as about 1 to 5 minutes may be employed since satisfactory aggregates can be obtained even at a low liquid content such as about 5 to 10% by mass.

The method for maintaining the carboxyl group-containing polymer particles under such specific temperature and humid conditions as mentioned above is not particularly restricted but includes, for example, the method comprising allowing the carboxyl group-containing polymer particles to stand into a thermohygrostat capable of being precisely controlled with regard to the space temperature and humidity, in which the space containing the carboxyl group-containing polymer particles is maintained at a uniform humidity without forming dew condensation due to change of temperature, in the state of a layer having such a thickness that they can absorb liquid uniformly. The term "stand" as used herein indicates that the carboxyl group-containing polymer particles are not in a flowing state. Thus, the case where the carboxyl group-containing polymer particles are moved in the thermohygrostat by means of an apparatus such as a belt conveyor without flowing is also regarded as a case of standing.

In the practice of the present invention, the method for allowing the carboxyl group-containing polymer particles to absorb a polar organic solvent to a liquid content of 5 to 25% by mass is not particularly restricted but includes, for example, the method comprising spraying the carboxyl group-containing polymer particles with fine drops of the polar organic solvent, and the method comprising maintaining the carboxyl group-containing polymer particles in a vapor atmosphere of the polar organic solvent. In particular, the method comprising maintaining the carboxyl group-containing polymer particles in an atmosphere at the temperature, which is lower than the boiling point of the polar organic solvent by about 20° C., to the temperature of the boiling point is desirably used. In maintaining the carboxyl group-containing polymer particles in a vapor atmosphere of the polar organic solvent, a long period of time may be required for the carboxyl group-containing polymer particles to aggregate when the temperature is lower than the temperature which is lower than the boiling point of the polar organic solvent by about 20° C. Further, energy is unfavorably required in large quantities when the temperature is higher than the boiling point of the polar organic solvent in maintaining the carboxyl group-containing polymer particles in a vapor atmosphere of the polar organic solvent.

Since the boiling point of the polar organic solvent is determined depending on the surrounding pressure, the boiling point of the polar organic solvent is determined based on the pressure at which the carboxyl group-containing polymer particles are maintained. Specific examples of the maintaining temperature include 45 to 65° C. for methanol (under atmospheric pressure), 59 to 79° C. for ethanol (under atmospheric pressure), 36 to 56° C. for acetone (under atmospheric pressure), 59 to 79° C. for ethyl methyl ketone (under atmospheric pressure), and 57 to 77° C. for ethyl acetate (under atmospheric pressure). It is to be noted that when the polar organic solvent whose boiling point is high under atmospheric pressure is used, the carboxyl group-containing polymer particles can be more easily aggregated by allowing the carboxyl group-containing polymer particles to absorb the polar organic solvent under reduced pressure.

The maintaining time cannot be absolutely specified because the state of aggregation varies depending on the liquid content attained at the temperature, and it is not particularly restricted provided that the carboxyl group-containing polymer particles can be maintained for a period necessary for sufficient aggregation thereof. For example, under such conditions as the temperature, which is lower than the boiling point of the polar organic solvent by about 20° C., it is desirable to maintain the carboxyl group-containing polymer particles for a period such as about 0.5 to 4 hours to attain a high liquid content such as about 15 to 20% by mass. On the other hand, under such conditions as the temperature of the boiling point of the polar organic solvent employed, a period of maintaining such as about 5 to 60 minutes may be employed because satisfactory aggregates can be obtained even at a low liquid content such as about 5 to 10% by mass.

The method for maintaining the carboxyl group-containing polymer particles under such specific temperature conditions as mentioned above is not particularly restricted. Examples thereof include the method comprising allowing the carboxyl group-containing polymer particles to stand in an apparatus capable of being precisely controlled with regard to the space temperature and vapor generation of the polar organic solvent, in which the space containing the carboxyl group-containing polymer particles is maintained at a uniform vapor atmosphere of the polar organic solvent without forming condensation of the polar organic solvent due to change of temperature, in the state of a layer having such a thickness that they can absorb liquid uniformly. The term "stand" as used herein indicates that the carboxyl group-containing polymer particles are not in a flowing state. Thus, the case where the carboxyl group-containing polymer particles are moved in the apparatus by means of an apparatus such as a belt conveyor without flowing thereof is also regarded as a case of standing.

When the carboxyl group-containing polymer particles are allowed to absorb water and/or a polar organic solvent to a liquid content of 5 to 25% by mass in the manner mentioned above, the particles are joined together, with water and/or a polar organic solvent as a binder, to form aggregates.

By drying the aggregate and then grinding the dried aggregate, the granular carboxyl group-containing polymer particles used in the present invention can be obtained.

The drying apparatus to be used in the above drying is not particularly restricted but may be, for example, a vacuum dryer. The drying temperature is desirably 30 to 130° C., and more desirably 50 to 110° C. When the drying temperature is lower than 30° C., a prolonged drying time may be required. When the drying temperature exceeds 130° C., the solubility of the granular carboxyl group-containing polymer particles to an alkaline electrolyte may be impaired. The liquid content after drying is desirably lower than 5% by mass from the viewpoint that the fluidity after grinding is to be secured and that the granular carboxyl group-containing polymer particles are not to form lumps during a long period of storage.

The grinding apparatus to be used in the above grinding is not particularly restricted but may be conventionally used grinding machines such as a pin mill grinder, a hammer mill grinder and a jet mill grinder.

In the obtained granular carboxyl group-containing polymer particles, if necessary, it is possible to remove finer particles and/or coarser particles by classification using a sieve so as to attain a median particle diameter of 100 to 800 μm.

The gelling agent for a battery of the present invention comprises the granular carboxyl group-containing polymer particles having specific characteristics, and various additives, such as an antiseptic agent and a stabilizer, may be added to the gelling agent depending on the purpose.

The gelling agent for a battery of the present invention can be used in combination with electrode active material and an alkaline electrolyte to produce electrodes (positive and negative electrodes).

Examples of the alkaline electrolyte include an aqueous potassium hydroxide solution, and an aqueous sodium hydroxide solution. Of these, 34 to 48% by mass of the aqueous potassium hydroxide solution is suitably used from the viewpoints of conductivity and stability of the electrode active material.

The electrode active material may not be particularly specified because it depends on the electrodes (positive or negative electrodes) to be produced. Examples of the positive electrode active material include: manganese compounds such as manganese dioxide; nickel compounds such as eutectic compounds of nickel oxyhydroxide with zinc and/or cobalt; and ferrate (VI) compounds such as potassium ferrate (VI), sodium ferrate (VI), lithium ferrate (VI), cesium ferrate (VI), silver ferrate (VI), strontium ferrate (VI), magnesium ferrate (VI), calcium ferrate (VI), barium ferrate (VI), and zinc ferrate (VI). Examples of the negative electrode active material include: zinc compounds such as a zinc alloy of zinc and other metals such as indium, bismuth, aluminum, lithium, sodium, potassium, rubidium, cesium, beryllium, magnesium, calcium, strontium, barium, titanium, vanadium, iron, copper, zirconium, niobium, silver, gallium, or tin; and zinc itself.

Various additives may be added to the positive and negative electrodes. Examples of the additives for the positive electrodes include yttrium oxide, erbium oxide, ytterbium oxide, and calcium fluoride from the viewpoint of improving the capacity maintenance rate in storage, and examples thererof also include graphite, acetylene black, and carbon black from the viewpoint of improving conductivity. On the other hand, examples of the additives of the negative electrodes include titanium oxide, bismuth oxide, copper oxide, indium oxide, tin oxide, and niobium oxide from the viewpoint of improving the thickening property of the gelling agent.

A battery can be produced by separating the positive electrode and the negative electrode with a separator so as to avoid physical contact therebetween, adding a negative electrode current collector to the negative electrode, and enclosing the electrodes in a metal can having a gasket, a metal plate, a metal sealing plate, etc.

The following examples and comparative examples illustrate the present invention more specifically. These examples are by no means limitative of the scope of the present invention.

EXAMPLE 1

A 500-ml four-necked flask equipped with a stirrer, a thermometer, a nitrogen inlet tube and a condenser was charged with 45 g (42.9 ml) of acrylic acid, 0.24 g of pentaerythritol allyl ether, 0.153 g of α,α'-azobisisobutyronitrile and 150 g (223.9 ml) of normalhexane, followed by uniform stirring for mixing up. Thereafter, for removing the oxygen present in the reaction vessel upper space, raw materials, and solvent, nitrogen gas was blown into the solution. Then, while the temperature was maintained at 60 to 65° C., the reaction was allowed to proceed in a nitrogen atmosphere for 4 hours.

After completion of the reaction, the slurry formed was heated to 90° C. to distill off the normalhexane, and the residue was further dried at 110° C. under reduced pressure (10 mmHg) for 8 hours, whereupon 41 g of the crosslinked carboxyl group-containing polymer particles was obtained as fine white powder.

The crosslinked carboxyl group-containing polymer particles obtained were spread thinly and uniformly on a stainless steel dish with a diameter of 35 cm, and the whole was allowed to stand in a thermohygrostat (model: LH30-11M, produced by Nagano Science Co., Ltd.) adjusted to a temperature of 30° C. and a relative humidity of 75% for 3 hours, whereupon a liquid content of 16% by mass was attained. The resulting product was dried at 80° C. for 2 hours and then ground using a pin mill grinder (trade name: Fine Impact Mill, produced by Hosokawa Micron Corporation), and the thus-obtained granular crosslinked carboxyl group-containing polymer particles were classified using a sieve with a mesh size of 1000 μm. Thereby, 38 g of a gelling agent for a battery was obtained.

With respect to the thus-obtained gelling agent for a battery, the granular carboxyl group-containing polymer particles were evaluated for the median particle diameter, bulk density, gel turbidity, gel density, gelation time and gel state at that time by the following methods. Table 1 shows the results.

(1) Median Particle Diameter

The term "median particle diameter" used herein refers to the particle diameter corresponding to the mesh size of the sieve used when an accumulated mass reaches 50% by mass of the total mass of the particles. Here, each accumulated mass is obtained by classifying the granular carboxyl group-containing polymer particles with the series of sieves and consecutively adding up the mass of the particles remaining on each sieve. More specifically, seven standard sieves according to JIS-Z-8801-1982 (850 μm, 500 μm, 355 μm, 300 μm, 250 μm, 180 μm and 106 μm in mesh size) and a receiver are prepared, the sieves are stacked up in the order as mentioned above, from top (largest mesh size) to bottom (smallest mesh size), 100 g of the granular carboxyl group-containing polymer particles is placed on the sieve largest in mesh size, sieving is carried out by shaking the sieves using a Ro-Tap sieve shaker for 10 minutes, the particles remaining on each sieve are then weighed, and the mass of the particles on each of the sieves is added up in descending order of mesh size to obtain each value of an accumulated mass. The particle diameter corresponding to the mesh size of the sieve used when an accumulated mass reaches 50% by mass of the total mass of the particles is calculated according to the formula mentioned below, and the particle diameter thus obtained is determined as the median particle diameter.

Median particle diameter (μm)=(50−$A$)/($C$−$A$)×($D$−$B$)+$B$

In the above formula, A is the accumulated value (g) obtained by consecutively adding up the mass of the granular carboxyl group-containing polymer particles remaining on the sieves in order of decreasing mesh size from the largest one until the accumulated mass reaches a level lower than 50% by mass but closest to 50% by mass of the total mass of the particles. C is the accumulated value (g) obtained by consecutively adding up the mass of the particles remaining on the sieves in order of decreasing mesh size from the largest one until the accumulated mass reaches a level higher than 50% by mass but closest to 50% by mass of the total mass of the particles. D is the mesh size (μm) of the sieve smallest in mesh size as involved in the calculation of the above-mentioned accumulated value A, and B is the mesh size (μm) of the sieve smallest in mesh size as involved in the calculation of the above-mentioned accumulated value C.

(2) Bulk Density

The "bulk density" used herein refers to the value obtained by dividing the mass of the granular carboxyl group-containing polymer particles by the volume of the polymer particles having that mass. More specifically, it is the value obtained by pouring 10 g of the granular carboxyl group-containing polymer particles into an empty 50-ml measuring cylinder from a position 5 cm above that cylinder while taking a time within 20 seconds, measuring the volume (ml) of the space occupied by the granular carboxyl group-containing polymer particles and dividing the mass of 10 g of the polymer particles by the volume (ml) of the space occupied by the granular carboxyl group-containing polymer particles.

(3) Gel Turbidity

The "gel turbidity" used herein refers to the value measured by the following measuring method. To a 300-ml beaker was added 196 g of 40% by mass of an aqueous potassium hydroxide solution. While the resultant mixture was stirred with a stirring blade with four paddles each having a diameter of 5 cm at a speed of 700 rotations per minute, 4 g of the granular carboxyl group-containing polymer particles was charged into the mixture at once. After the 3-hour stirring, a gel was prepared. The obtained gel was put into a 1-cm cell, and measured for the turbidity with an integrating sphere turbidimeter (model: SEP-PT-706D, produced by Mitsubishi Chemical Corporation).

The gel turbidity can be determined by calculating a ratio of scattered light due to fine particles in liquid to transmitted light and comparing the ratio with a ratio of scattered light to transmitted light of a standard turbidity solution. Hereinafter, further detailed description will be given.

When parallel light from a light source passes through a liquid layer in a cell, the light enters an integrating sphere in the form of the parallel light and the scattered light caused by turbidity in liquid. The amount of the scattered transmitted light (amount of diffuse transmitted light, symbol: Td) that is reflected on the inner surface of the integrating sphere is obtained by a photo detector (D1) that is attached in the sphere. The amount of parallel transmitted light (symbol: Tp) is obtained by a photo detector (D2) attached to the tip of a light trap.

The measurement principle is based on that the ratio of the amount of scattered transmitted light (Td) to the amount of parallel transmitted light (Tp) is proportional to turbidity.

T∝(Td/Tp)

T: Turbidity of a sample (4) Gel Density

The "gel density" used herein refers to the value determined by dividing the gel mass (g) by the gel volume (100 ml) when the gel prepared in the aforementioned "gel turbidity" is filled up into a 100-ml measuring cylinder quietly so as to avoid air inclusion.

(5) Gelation Time

The gelation time used herein refers to the period of time from the addition of the granular carboxyl group-containing polymer particles to 40% by mass of the aqueous potassium hydroxide solution to the dissolution of all the granular carboxyl group-containing polymer particles on preparation of the gel in the aforementioned "gel turbidity". The dissolution of the granular carboxyl group-containing polymer particles in 40% by mass of the aqueous potassium hydroxide solution is determined to be completed upon visually observing that the polymer particles, which are white when dried, are dissolved and lose the shape to thereby form a paste gel in 40% by mass of the aqueous potassium hydroxide solution.

EXAMPLE 2

A 500-ml four-necked flask equipped with a stirrer, a thermometer, a nitrogen inlet tube and a condenser was charged with 45 g (42.9 ml) of acrylic acid, 0.68 g of Blemmer VMA70 (produced by NOF Corporation; a mixture of 10 to 20 parts by mass of stearyl methacrylate, 10 to 20 parts by mass of eicosanyl methacrylate, 59 to 80 parts by mass of behenyl methacrylate and at most 1 part by mass of tetracosanyl methacrylate) as the (meth)acrylic acid alkyl ester containing an alkyl group of 10 to 30 carbon atoms, 0.153 g of α,α'-azobisisobutyronitrile and 150 g (223.9 ml) of normal-hexane, followed by uniform stirring for mixing up. Thereafter, for removing the oxygen present in the reaction vessel upper space, raw materials, and solvent, nitrogen gas was blown into the solution. Then, while the temperature was maintained at 60 to 65° C., the reaction was allowed to proceed in a nitrogen atmosphere for 4 hours.

After completion of the reaction, the slurry formed was heated to 90° C. to distill off the normalhexane, and the residue was further dried at 110° C. under reduced pressure (10 mmHg) for 8 hours, whereupon 42 g of the alkyl-modified carboxyl group-containing polymer particles was obtained as fine white powder.

The alkyl-modified carboxyl group-containing polymer particles obtained were spread thinly and uniformly on a stainless steel dish with a diameter of 35 cm, and the whole the form of fine white powder, which were used upon production of granular carboxyl group-containing polymer particles, was obtained.

With respect to the thus-obtained gelling agent for a battery, the crosslinked carboxyl group-containing polymer particles in the form of fine white powder were evaluated for the median particle diameter, bulk density, gel turbidity, gel density, gelation time and gel state at that time. The median particle diameter was measured with a laser diffraction type particle size distribution measuring apparatus (model: SALD-2000J, produced by Shimadzu Corporation, dispersion solvent: normalhexane). Table 1 shows the results.

TABLE 1

| | Form | Median particle diameter [μm] | Bulk density [g/ml] | Gel turbidity [ppm] | Gel density [g/ml] | Gelation time (min) (Gel state) |
|---|---|---|---|---|---|---|
| Example 1 | Granular | 520 | 0.50 | 77 | 1.39 | 45 (Paste) |
| Example 2 | Granular | 350 | 0.55 | 82 | 1.41 | 30 (Paste) |
| Comparative Example 1 | Granular | 1300 | 0.41 | 330 | 1.36 | 90 (Paste) |
| Comparative Example 2 | Fine powder | 5-10 | 0.12 | 214 | 1.35 | 120 (Including undissolved lumps) | was allowed to stand in a thermohygrostat (model: LH30-11M, produced by Nagano Science Co., Ltd.) adjusted to a temperature of 30° C. and a relative humidity of 75% for 3 hours, whereupon a liquid content of 16% by mass was attained. The resulting product was dried at 80° C. for 2 hours and then ground using a pin mill grinder (trade name: Fine Impact Mill, produced by Hosokawa Micron Corporation), and the thus-obtained granular alkyl-modified carboxyl group-containing polymer particles were classified using a sieve with a mesh size of 600 μm to remove coarser particles. Thereby, 39 g of a gelling agent for a battery as adjusted in particle size was obtained.

With respect to the thus-obtained gelling agent for a battery, the granular carboxyl group-containing polymer particles were evaluated for the median particle diameter, bulk density, gel turbidity, gel density, gelation time and gel state at that time. Table 1 shows the results.

COMPARATIVE EXAMPLE 1

In Example 1, particles left on a sieve, when classified with the sieve having a mesh size of 1000 μm, were collected to give a gelling agent for a battery.

With respect to the thus-obtained gelling agent for a battery, the granular carboxyl group-containing polymer particles were evaluated for the median particle diameter, bulk density, gel turbidity, gel density, gelation time and gel state at that time. Upon measurement of the median particle diameter, the combination of the standard sieves was changed to the combination of two standard sieves as specified in JIS-Z 8801-1982 (mesh sizes: 1.7 mm (1700 μm) and 1 mm (1000 μm)) and a receiver. Table 1 shows the results.

COMPARATIVE EXAMPLE 2

In Example 1, a gelling agent for a battery comprising crosslinked carboxyl group-containing polymer particles in The results of Table 1 show that the gelling agent for a battery obtained in each example provides a paste gel in a short period of time, the gel exhibits a low turbidity owing to the reduction of bubbles included therein and a high gel density.

INDUSTRIAL APPLICABILITY

The gelling agent of the present invention forms a paste gel in a short period of time on dissolution in an alkaline electrolyte. The gel has less bubbles and a high gel density. The gelling agent is, therefore, suitably employed as a gelling agent for an alkaline battery. Also, the improvement of a gel density enhances a gel filling rate of a battery, and better battery performances are expected.

The invention claimed is:
1. A gelling agent for a battery,
which comprises granular carboxyl group-containing polymer particles having a median particle diameter of 100 to 800 μm and a bulk density of 0.30 g/ml or more, wherein the gelling agent has a gel turbidity of 200 ppm or less, a gel density of 1.37 g/ml or more in a gel, and a gelation time of 60 minutes or less upon preparing a gel, said gel is prepared by adding 2 parts by mass of the granular carboxyl group-containing polymer particles to 98 parts by mass of 40% by mass of an aqueous potassium hydroxide solution, and
a carboxyl group-containing polymer particle for forming the granular carboxyl group-containing polymer particles is produced by polymerizing an α,β-unsaturated carboxylic acid-type compound in an inert solvent that dissolves the α,β-unsaturated carboxylic acid-type compound but does not dissolve a carboxyl group-containing polymer.
2. The gelling agent for a battery according to claim 1, wherein the granular carboxyl group-containing polymer particle is produced by providing a carboxyl group-containing polymer particle having an α,β-unsaturated carboxylic acid-type compound as a main monomer component so as to absorb at least one solution selected from the group consisting of water and a polar organic solvent and form an aggregate, then drying the aggregate, and then grinding the dried aggregate.

3. A battery comprising the gelling agent for a battery according to claim 1.